United States Patent [19]

Vassiliou

[11] 4,353,950

[45] Oct. 12, 1982

[54] STAIN-RESISTANT COOKWARE MULTI-LAYER COATING SYSTEM COMPRISING PIGMENTS AND A TRANSLUSCENT OUTER LAYER

[75] Inventor: Eustathios Vassiliou, Newark, Del.

[73] Assignee: E. I. Du Pont de Nemours and Company, Wilmington, Del.

[21] Appl. No.: 55,478

[22] Filed: Jul. 6, 1979

[51] Int. Cl.³ .................... A47J 36/04; A47J 37/10; B32B 27/08; B32B 27/20

[52] U.S. Cl. .................... 428/195; 219/385; 219/391; 219/438; 220/458; 427/409; 428/204; 428/324; 428/422; 428/446; 428/448; 428/450; 428/457; 428/458; 428/473.5; 428/480

[58] Field of Search .............. 428/421, 422, 195, 204, 428/324, 446, 448, 450, 457, 458, 473.5, 480; 219/438, 391, 385; 220/458; 427/409

[56] References Cited

U.S. PATENT DOCUMENTS

| | | | |
|---|---|---|---|
| 2,979,418 | 4/1961 | Dipner | 428/422 |
| 3,241,545 | 3/1966 | Reinert et al. | 126/19 R |
| 3,470,014 | 9/1969 | Koblitz | 428/422 |
| 3,526,532 | 9/1970 | Heiberger | 428/422 |
| 3,692,558 | 9/1972 | Werner | 428/422 |
| 3,970,627 | 7/1976 | Seymus | 428/422 |
| 4,031,286 | 6/1977 | Seymus | 428/469 |
| 4,049,863 | 9/1977 | Vassiliou | 428/422 |
| 4,054,704 | 10/1977 | Vassiliou | 428/422 |
| 4,054,705 | 10/1977 | Vassiliou | 428/422 |
| 4,064,303 | 12/1977 | Vassiliou | 428/422 |
| 4,087,394 | 5/1978 | Concannon | 260/29.6 F |
| 4,118,537 | 10/1978 | Vary et al. | 428/422 |
| 4,120,608 | 10/1978 | Vassiliou | 428/422 |
| 4,122,226 | 10/1978 | Vassiliou | 428/204 |
| 4,123,401 | 10/1978 | Berghmans et al. | |
| 4,143,204 | 3/1979 | Fang | 428/422 |
| 4,145,325 | 3/1979 | Vassiliou | 428/422 |
| 4,147,683 | 4/1979 | Vassiliou | 428/422 |
| 4,150,008 | 4/1979 | Vassiliou | 428/422 |
| 4,177,320 | 12/1979 | Yoshimura et al. | |
| 4,179,542 | 12/1979 | Christofas et al. | 428/422 |
| 4,180,609 | 12/1979 | Vassiliou | 428/363 |

*Primary Examiner*—James C. Cannon
*Attorney, Agent, or Firm*—Richard H. Burgess

[57] ABSTRACT

Heat-stable coatings on cookware can be made stain-resistant by including a pigmented brown intermediate layer and a clear topcoat layer containing mica or coated mica platelets for sparkle. Such coatings are particularly suitable for electrical cookware.

14 Claims, No Drawings

STAIN-RESISTANT COOKWARE MULTI-LAYER COATING SYSTEM COMPRISING PIGMENTS AND A TRANSLUSCENT OUTER LAYER

BACKGROUND OF THE INVENTION

This invention relates to coated cookware having a heat-stable multi-layer nonstick coating.

In modern cookware coatings, it has been found desirable to provide a sparkling appearance. However, sooner or later, food stains appear in most cookware coatings. These stains generally have a brown color and are formed by pyrolysis of particles of food, oil or other materials which penetrate into the more-or-less porous outer layers of the coating. This phenomenon occurs with most types of cookware coating, including coatings based on polytetrafluoroethylene (PTFE).

The problem of staining becomes more acute when the temperature profile across the face of the cooking surface is not uniform. This occurs particularly in cookware heated by an electrical resistance element in the shape of a pattern imbedded in or against the back of the cookware, i.e., the surface opposite that on which the coating system is applied. This staining phenomenon takes the form of a brown line following the pattern of the heating element.

It would be desirable to be able to coat electric cookware in such a way that no conspicuous stained pattern develops during use of the cookware.

SUMMARY OF THE INVENTION

This invention provides a cookware article comprising a substrate coated with a heat-stable coating system having three layers, each layer comprising a polymer stable at temperatures above 300° C., said layers including a primer layer in direct contact with the substrate and which adheres the coating system to the substrate, an intermediate layer in contact with the primer layer and containing pigments which mask the brown color of food stains that develop in the coating system during cooking, and a light-transmitting topcoat layer in contact with the intermediate layer and containing mica or mica platelets coated with pigment, giving a sparkling appearance to the coating system.

DETAILED DESCRIPTION OF THE INVENTION

It has been found that food stains do not appear conspicuously on cookware coatings, even on cookware heated with a circular electrical heating element on the back, if a three-layer coating is used including a primer, an intermediate layer with enough pigment of an appropriate color to mask the brown color of food stains that develop in the coating, and a light-transmitting top layer containing mica or mica platelets coated with pigment to give a sparkling appearance. Dark brown or black pigments in the intermediate layer are desirable. The present invention draws on technology expressed in other U.S. Pat Nos., including 4,123,401—Berghmans and Vary (Oct. 31, 1978) directed to coating compositions containing fluoropolymer, mica, decomposable polymer, and a liquid carrier, particularly suited for use as topcoats;

4,049,863—Vassiliou (1977) directed to primers containing fluoropolymer, colloidal silica, the salt of a polyamic acid, and a coalescing agent, mica, and a liquid carrier;

4,087,394—Concannon (May 2, 1978) directed to aqueous coating compositions of fluorocarbons and a second film-forming material which can be the salt of a polyamic acid;

4,143,204—Fang (Mar. 6, 1979) directed to coated articles in which the coating comprises a copolymer of tetrafluoroethylene and hexafluoropropylene along with an auxiliary film-forming material;

and the following five U.S. Pat. Nos. which are concerned with heat-stable coatings containing oxidation catalysts and/or antioxidants:

4,054,704—Vassiliou (1977),
4,054,705—Vassiliou (1977),
4,064,303—Vassiliou (1977),
4,120,608—Vassiliou (Oct. 17, 1978), and
4,122,226—Vassiliou (Oct. 24, 1978); and finally, application Ser. No. 881,668, filed Feb. 27, 1978 and allowed May 25, 1979, now U.S. Pat. No. 4,180,609—Vassiliou (Dec. 25, 1979), directed to coated articles having a multi-layer coating with fluorocarbon and mica in a basecoat and a topcoat, and with a defined relationship between the concentration of mica in the basecoat and that in the topcoat.

The above-mentioned patents and application are incorporated herein by reference.

Preferably by using techniques of the above-identified patents and the application, cookware is coated with a primer layer, an intermediate layer and a topcoat layer which have the defined relationships to obtain the advantages of the invention.

The following example teaches a preferred embodiment of the invention. Parts, percentages and proportions herein are by weight except where indicated otherwise.

The following coating compositions were used to make the respective coating layers in accordance with the teachings of Example 2 of U.S. Pat. No. 4,049,863 for the primer layer and Example 4 of U.S. Pat. Nos. 4,123,401 and 4,180,609 for the intermediate and topcoat layers.

Briefly, the procedure involved gritblasting an aluminum substrate, allowing the primer to air dry then spraying on the intermediate and topcoat layers, wet-on-wet, following by a bake at 425° C. for 5 minutes. The resulting coatings were a dark chocolate brown with a sparkling appearance, and they did not show food stain after extensive cooking when the substrate was an electric grill with a patterned electrical resistance heating element embedded in the aluminum.

TABLE I

| PRIMER COATING COMPOSITION | |
|---|---|
|  | % Wt. |
| PTFE Solids (60% solids in water, Du Pont T30) | 11.16 |
| Ludox ® AM Colloidal Silica Solids (Du Pont) | 0.96 |
| Amide-Imide Resin (Polyamide acid of Example 1A of U.S. Pat. No. 4,049,863) | 4.93 |
| Octyl Phenol Polyether Alcohol | 0.67 |
| Deionized Water | 67.76 |
| Furfuryl Alcohol | 3.60 |
| Diethyl Ethanolamine | 0.65 |
| Triethyl Amine | 1.31 |
| N-Methyl Pyrrolidone | 2.46 |
| Cobalt Aluminate Pigment | 5.88 |
| Red Iron Oxide Pigment | 0.59 |
| Afflair ® Pigment (Du Pont) TiO$_2$ Coated Mica | 0.05 |

TABLE I-continued

| PRIMER COATING COMPOSITION | |
|---|---|
| | % Wt. |
| | 100.00 |

TABLE II

| INTERMEDIATE COATING COMPOSITION | |
|---|---|
| | % Wt. |
| PTFE Solids (60% solids in water, Du Pont T30) | 42.39 |
| Phosphoric Acid (100%) | 0.08 |
| Sodium Lauryl Sulfate | 0.03 |
| Sodium Polynaphthalene Sulfonate | 0.01 |
| Acrylic Latex Solids (methyl methacrylate/ethyl acrylate/methacrylic acid - 39/57/4 terpolymer dispersion (40% in water) 0.2 micron average particle size) | 5.04 |
| Deionized Water | 39.19 |
| Octyl Phenol Polyether Alcohol | 2.54 |
| Triethanolamine | 2.82 |
| Oleic Acid | 1.14 |
| Toluene | 4.37 |
| Butyl Carbitol | 1.49 |
| Red Iron Oxide Pigment | 0.28 |
| Channel Black | 0.10 |
| Afflair ® Pigment (DuPont) $TiO_2$ Coated Mica | 0.43 |
| Aluminosilicate Pigment | 0.05 |
| | 100.00 |

TABLE III

| TOPCOAT COATING COMPOSITION | |
|---|---|
| PTFE Solids (60% solids in water, Du Pont T30) | 43.05 |
| Sodium Lauryl Sulfate | 0.03 |
| Acrylic Latex Solids (as in Table II) | 4.81 |
| Deionized Water | 42.93 |
| Triton ® X-100 | 2.58 |
| Iriethanolmine | 1.59 |
| Oleic Acid | 0.75 |
| Toluene | 2.85 |
| Butyl Carbitol | 0.98 |
| Afflair ® Pigment (Du Pont) $TiO_2$ Coated Mica | 0.43 |
| | 100.00 |

Instead of the red iron oxide-carbon black combination of Table III, one can use equivalent amounts of burnt umber, having an approximate composition shown in Table IV.

TABLE IV

| COMPOSITION OF BURNT UMBER | |
|---|---|
| | % |
| $Fe_2O_3$ | 40-73 |
| $SiO_2$ | 10-20 |
| $Al_2O_3$ | 10-20 |
| $MnO_2$ | 4-19 |
| $H_2O$ sol. salts | 0.4 |
| Pb | 0.02 |
| As | 0.03 |
| Mg | 0.0075 |

I claim:

1. A cookware article comprising a substrate coated with a heat-stable coating system comprising three layers, each layer containing a polymer stable at temperatures above 300° C., said layers including a primer layer in direct contact with the substrate and which adheres the coating system to the substrate, an intermediate layer in contact with the primer layer and containing pigments which mask the brown color of food stains that develop in the coating system during cooking, and a light-transmitting topcoat layer in contact with the intermediate layer and containing mica or mica platelets coated with pigment, giving a sparkling appearance to the coating system.

2. The article of claim 1 in which the heat-stable polymer is a silicone, polysulfide, polymerized parahydroxy-benzoic acid, a polysulfone, a polyimide, a polyamide, a salt of a polyamic acid, a polysulfonate, a polysulfonamide, a fluorocarbon polymer, or a mixture of two or more of the above, and said heat-stable polymers are the same or in any combination in the three layers of the coating.

3. The article of claim 1 in which the intermediate layer includes red iron oxide pigment, carbon black, and an antioxidant.

4. The article of claim 3 in which the antioxidant is a phosphorus, sulfur, or boron compound.

5. The article of claim 4 in which the antioxidant is phosphoric acid.

6. The article of claim 1 in which the intermediate layer includes black iron oxide pigment.

7. The article of claim 1 in which the intermediate layer includes burnt umber.

8. The article of claim 1 in which the topcoat contains an antioxidant.

9. The coated article of claim 8 in which the topcoat contains (a) about 80-99.8%, by weight of the total of (a) and (b), of a particulate polymer polymerized or copolymerized from monomers selected from one or more monoethylenically unsaturated hydrocarbon monomers and hydrocarbon ether monomers, said monomers being completely substituted with fluorine atoms or a combination of fluorine atoms and chlorine atoms, and (b) about 0.2-20%, by weight of the total of (a) and (b), of mica particles, mica particles coated with pigment, or metal flake; the total of (a) and (b) equaling 100%.

10. The article of claim 9 in which the topcoat includes polytetrafluoroethylene or a compolymer of tetrafluoroethylene and hexafluoropropylene.

11. The article of claim 1 containing an electrical resistance heat source.

12. The article of claim 11 in which the electrical heat source is in the form of a discrete pattern on the opposite side of the substrate from the coating system.

13. The article of claim 1 in which the primer includes the salt of a polyamic acid and colloidal silica; the intermediate layer includes red iron oxide pigment, carbon black, and phosphoric acid; and the topcoat includes polytetrafluoroethylene, and mica platelets coated with titanium dioxide pigment.

14. The article of claim 1 in which the primer includes the salt of a polymeric acid and colloidal silica; the intermediate layer includes red iron oxide pigment, carbon black, and phosphoric acid; and the topcoat includes a copolymer of tetrafluoroethylene and hexafluoropropylene, and mica platelets coated with titanium dioxide pigment.

* * * * *